United States Patent [19]
Fujioka

[11] Patent Number: 5,397,388
[45] Date of Patent: Mar. 14, 1995

[54] HOT MELT INK FOR INK JET PRINTERS
[75] Inventor: Masaya Fujioka, Nagoya, Japan
[73] Assignee: Brother Kogyo Kabushiki Kaisha, Japan
[21] Appl. No.: 136,758
[22] Filed: Oct. 15, 1993
[30] Foreign Application Priority Data
  Feb. 5, 1993 [JP] Japan .................. 5-018707
  Feb. 5, 1993 [JP] Japan .................. 5-018708
[51] Int. Cl.⁶ ............................. C09D 11/00
[52] U.S. Cl. .................. 106/28 A; 106/22 A; 106/27 A; 106/29 A; 106/30 A; 106/31 R
[58] Field of Search ........ 106/22 A, 23 A, 27 A, 106/28 A, 29 A, 30 A, 31 R

[56] References Cited
U.S. PATENT DOCUMENTS
  4,390,369  6/1983  Merritt et al. .......... 106/31 R
  4,659,383  4/1987  Lin et al. ............. 106/27 A
  4,822,418  4/1989  Lin et al. ............. 106/27 R
  5,000,786  3/1991  Matsuzaki ............. 106/27 A FOREIGN PATENT DOCUMENTS
  0099682   2/1984   European Pat. Off. .
  0176228   4/1986   European Pat. Off. .
  0565735  10/1993   European Pat. Off. .
  91/18066 11/1991   WIPO .

Primary Examiner—Helene Klemanski
Attorney, Agent, or Firm—Oliff & Berridge

[57] ABSTRACT

A hot melt ink for an ink jet printer comprises 50 wt. % or more of a solid wax that is solid at normal temperatures and has a solubility parameter of not larger than 9.00, an organic substance having a solubility parameter greater than that of the solid wax, a polymer material that is miscible with at least one of the solid wax and the organic substance and which has a weight average molecular weight of not less than 500, and a coloring material. The hot melt ink exhibits good dispersability and dispersion stability of the coloring material with good heat stability and color fastness to light.

21 Claims, 3 Drawing Sheets

Fig.3

| | DISPERSABILITY | DISPERSION STABILITY | HEAT STABILITY |
|---|---|---|---|
| EXAMPLE 1 | ◎ | ◎ | ◎ |
| EXAMPLE 2 | ◎ | ◎ | ◎ |
| EXAMPLE 3 | ◎ | ◎ | ◎ |
| EXAMPLE 4 | ◎ | ◎ | ◎ |
| COMPARATIVE EXAMPLE 1 | × | — | — |
| COMPARATIVE EXAMPLE 2 | × | — | — |
| COMPARATIVE EXAMPLE 3 | ◎ | × | — |
| COMPARATIVE EXAMPLE 4 | ◎ | △ | × |
| COMPARATIVE EXAMPLE 5 | ◎ | ◎ | × |

Fig.4

| | DISPERSABILITY | DISPERSION STABILITY | HEAT STABILITY |
|---|---|---|---|
| EXAMPLE 5 | ◎ | ◎ | ◎ |
| EXAMPLE 6 | ◎ | ◎ | ◎ |
| EXAMPLE 7 | ◎ | ◎ | ◎ |
| EXAMPLE 8 | ◎ | ◎ | ◎ |
| COMPARATIVE EXAMPLE 6 | × | — | — |
| COMPARATIVE EXAMPLE 7 | × | — | — |
| COMPARATIVE EXAMPLE 8 | ◎ | × | — |
| COMPARATIVE EXAMPLE 9 | ◎ | ◎ | × |
| COMPARATIVE EXAMPLE 10 | ◎ | ◎ | × |

HOT MELT INK FOR INK JET PRINTERS

BACKGROUND OF THE INVENTION

1. Field of the Invention

The present invention relates to hot melt inks for ink jet printers and, more particularly, to a hot melt ink that is solid at normal temperatures and used for printing after being thermally melted at temperatures higher than normal temperatures.

2. Description of Related Art

Ink jet printers have many advantages in printing techniques, such as noiselessness, high speed, high quality and coloration. However, ink droplets jetted from an ink jet nozzle are directly deposited onto recording paper, causing the print quality and print drying time to be influenced depending on the type of recording paper. If low-quality paper is used for recording, a considerable deterioration in quality of the resultant print has been experienced.

It is known that to solve this problem, hot melt ink having a melting point higher than room temperature is used, achieving print of a uniform dot size irrespective of the type of recording paper. Ink compositions for this purpose have been proposed including ink containing natural wax as disclosed in U.S. Pat. No. 4,390,369, ink containing stearic acid as disclosed in European Unexamined Patent Publication No. 99,682, and ink containing a $C_{20}$-$C_{24}$ acid or alcohol along with a ketone having a relatively high melting point, in which all the inks make use of dyes as a coloring material. Moreover, in U.S. Pat. Nos. 4,659,383 and 4,822,418 hot melt inks are proposed in which solid pigments are dispersed in waxes or $C_{18}$-$C_{24}$ fatty acids having a melting point higher than 65° C.

However, the known hot melt inks for ink jet printers described above have problems such as the degree of dye solubility when dyes are used as the coloring material. This limits the types of dyes that can be used. In addition, the ink cannot necessarily be kept stabilized when heated over a long time or on repetition of heating and cooling cycles. Poor color fastness to light is another problem. On the other hand, when pigments are used as the coloring material, good color fastness to light is attained but the dispersability of the pigments and the stability of the dispersed pigments are not always satisfactory. As a result, the ink's storage stability under heating conditions is not good.

SUMMARY OF THE INVENTION

The invention provides hot melt inks having good dispersability, good dispersion stability and coloring material fusibility, and excellent heat stability and color fastness to light.

In particular, the invention provides a hot melt ink for an ink jet printer, comprising a solid wax that is solid at normal temperatures, whose solubility parameter is equal to or less than 9.50 and which is present in amounts of 50% by weight or more; an organic substance that is miscible with the solid wax at normal temperatures and whose solubility parameter is greater than that of the solid wax; a polymer material that is miscible with at least one of the solid wax and the organic substance and whose weight average molecular weight is equal to or more than 500; and a coloring material.

BRIEF DESCRIPTION OF THE DRAWINGS

Preferred embodiments of the present invention will be described in detail with reference to the accompanying drawings, wherein:

FIG. 3 is a table showing the experimental results of a first preferred embodiment of the invention; and FIG. 4 is a table showing the experimental results of a second preferred embodiment of the invention.

DETAILED DESCRIPTION OF PREFERRED EMBODIMENTS

Figure 1:
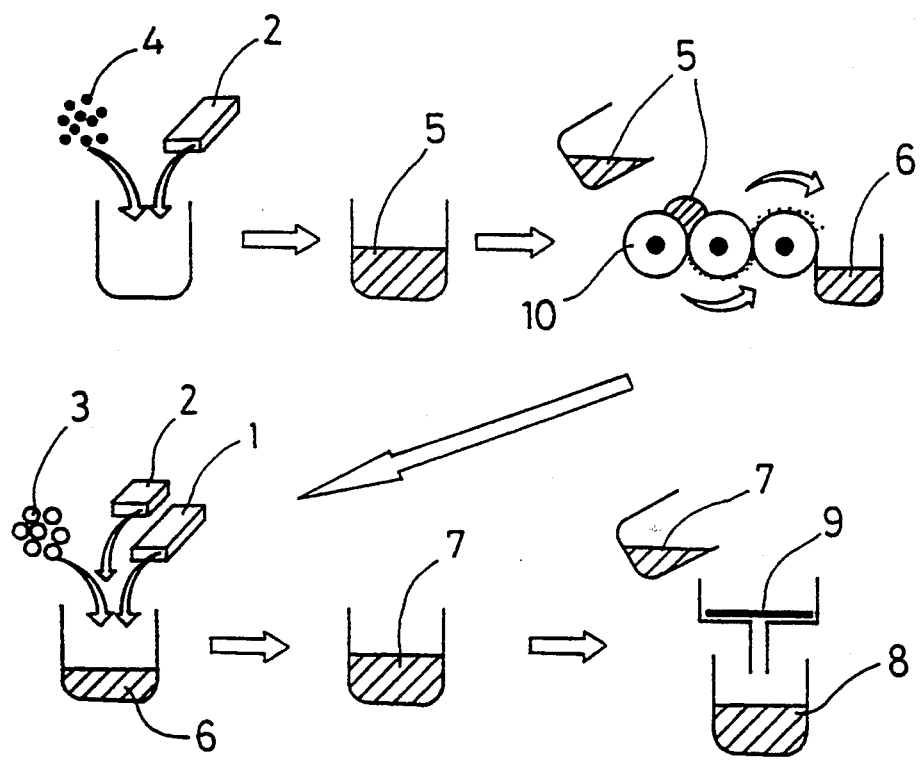
FIG. 1 is a schematic view showing a procedure for preparing an ink according to the invention.

A first preferred embodiment of the invention is described with reference to the accompanying drawings.

Hot melt ink for an ink jet printer according to a first embodiment of the invention should contain waxes that are solid at normal temperatures. The wax serves as a dispersion medium for pigments and as a solvent for dyes. The solid wax at normal temperatures is, of course, solid at normal temperatures and is melted by applying of heat energy. At temperatures higher than its melting point, the wax is converted into a liquid having a viscosity suitable for ink jetting. The wax is thermally stable at these suitable ink jetting temperatures.

The normal temperature solid wax should preferably have a melting point not lower than 60° C., more preferably not lower than 65° C. and, most preferably not lower than 70° C., when measured according to a melting point testing method described in JIS K2235.

The polarity of the normal temperature solid wax is preferably described using a solubility parameter (SP). The normal temperature solid wax should preferably have an SP of not larger than 9.00, more preferably not larger than 8.50 and, most preferably not larger than 8.00.

The normal temperature solid wax's molecular weight distribution is preferably expressed in terms of a standard deviation (SD) of the distribution in the number of carbon atoms. Such an SD is calculated from the results of measurement through gel permeation chromatography using a differential refractometer as a detector or programmed-temperature gas chromatography using a thermal conductivity meter as a detector. In general, if the SD is zero, the substance suffers simple dispersion. The greater the SD becomes, the wider the substance's molecular weight distribution. In practicing the invention, the standard deviation of the normal temperature solid wax's molecular weight distribution in number of carbon atoms should preferably not be larger than 3.3, more preferably not larger than 3.2 and, most preferably not larger than 3.1.

If the SP of the solid wax is not lower than 9.01, it becomes thermally unstable, resulting in a considerable degree of deterioration when the wax is heated over long periods of time. If the SD of the solid wax exceeds 3.3, the amount of low molecular weight components is significantly increased so that evaporation during the course of heating and storage is not negligible or the wax may become thermally unstable. This eventually leads to considerable deterioration on heating over a long time.

Various substances may be used as the normal temperature solid wax. For instance, there may be mentioned petroleum waxes, of which paraffin waxes or microcrystalline waxes are preferred; mineral waxes, of which ozocerite or ceresine is preferred; synthetic hydrocarbons, of which Fischer-Tropsch waxes or polyethylene waxes are preferred; ketones, of which stearone or laurone is preferred; and esters of which methyl stearate or octadecyl stearate is preferred. These waxes may be used singly or in combination of two or more.

The organic substances used in this embodiment should not always be solid at normal temperatures and have great polarity relative to the normal temperature solid wax. The organic substance is miscible with the normal temperature solid wax and serves to readily disperse pigments in the ink. When dyes are used as a coloring material, the organic substance enhances the solubility between the dye and the solid wax.

In practicing the invention, the SP of the organic substance should preferably not be less than 9.01. The reason for this is because when the SP is not larger than 9.00, the pigment dispersability may become unsatisfactory. In addition, the dye's solubility may become unsatisfactory.

Examples of useful organic substances include: petroleum waxes, of which petrolatams are preferred; plant waxes, of which candelilla wax, carnauba wax, Japan wax, jojoba oil, jojoba solid wax and the like are preferred; animal waxes, of which beeswax, lanolin, whale oil and the like are preferred; mineral waxes, of which montan wax is preferred; hydrogenated waxes, of which hardened castor oil or hardened castor oil derivatives are preferred; modified waxes, of which montan wax derivatives, paraffin wax derivatives, microcrystalline wax derivatives or polyethylene wax derivatives are preferred; higher fatty acids, of which behenic acid, stearic acid, palmitic acid, myristic acid, lauric acid or oleic acid is preferred; higher alcohols, of which stearyl alcohol, behenyl alcohol or the like is preferred; hydroxystearic acids, of which 12-hydroxystearic acid or 12-hydroxystearic acid derivatives are preferred; fatty acid amides, of which lauric acid amide, stearic acid amide, oleic acid amide, erucic acid amide, ricinoleic acid amide, 12-hydroxystearic acid amide, specific types of fatty acid amides or N-substituted fatty acid amides are preferred; amines, of which dodecylamine, tetradecylamine or octadecylamine is preferred; esters, of which glycerine and fatty acid esters, sorbitan and fatty acid esters, polyoxyethylene and fatty acid esters are preferred; and polymerized waxes, of which $\alpha$-olefin-maleic acid copolymer waxes are preferred. These organic substances may be used singly or in combinations of two or more.

The polymer material used in the present invention should have a molecular weight greater than those of the normal temperature solid wax and organic substance. The polymer should be miscible with at least one of the solid wax and the organic substance. The polymer material provides the resulting ink with a high transparency and leads to a controlled ink hardness and good wear resistance.

The polymer materials stabilize a dispersed pigment because of the polymer's steric hindrance effect. The polymer's molecular weight is determined by molecular weight classification through gel permeation chromatography using a differential refractometer as a detector or through programmed-temperature gas chromatography using a thermal conductivity meter as a detector. The polymer's weight average molecular weight Mw should preferably be in the range of from 500 to 500,000, more preferably from 600 to 400,000 and, most preferably from 700 to 300,000. If the average molecular weight is less than 500, the steric hindrance effect is unlikely to develop, resulting in poor dispersion stability.

If dyes are not completely dissolved in the matrix, the polymer material prevents the dyes, which are present in the form of ultrafine particles, from settling due to the steric hindrance effect.

The polymer materials should preferably be oil-soluble resins. Examples of useful oil-soluble resins include olefin resins, of which polyethylene resins, polypropylene resins or polyisobutylene resins are preferred; vinyl resins, of which ethylene-vinyl acetate copolymer resins, vinyl chloride-vinyl acetate copolymer resins, or ethylene-vinyl chloride-vinyl acetate resins are preferred; acrylic resins, of which methacrylate resins, polyacrylic ester resins, ethylene-ethyl acrylate copolymer resins, and ethylene-methacrylic copolymer resins are preferred; phenolic resins, polyurethane resins, polyamide resins, polyester resins, ketone resins, alkyd resins, rosin-based resins, hydrogenated rosin resins, petroleum resins, hydrogenated petroleum resins, maleic acid resins, butyral resins, terpene resins, hydrogenated terpene resins, cumarone-indene resins, and the like. These polymer materials may be used singly or in combinations of two or more.

The pigments used in the present invention are present in a finely dispersed state in mixtures with the normal temperature solid waxes, organic substances and polymer materials. On the other hand, dyes are melted in mixtures with the normal temperature solid waxes, organic substances and polymer materials. These pigments or dyes function as coloring materials.

The type of pigment is not critical, and organic or inorganic pigments may be arbitrarily selected. In this connection, however, in order to develop the effects of the invention significantly, preferred organic pigments include quinacridone organic pigments, azo lake organic pigments, iso-indolinone organic pigments, disazo organic pigments, phthalocyanine pigments and the like. With inorganic pigments, carbon black exhibits a remarkable effect. These pigments may be used singly or in combinations of two or more. For color control, dyes may be added to the pigments.

On the other hand, dyes which are usable in the present invention may be basically solvent dyes. Examples of such dyes include azo dyes, metal complex dyes, naphthol dyes, anthaquinone dyes, indigo dyes, carbonium dyes, quinoneimine dyes, cyanine dyes, quinoline dyes, nitro dyes, nitroso dyes, benzoquinone dyes, naphthoquinone dyes, naphthalimide dyes, perionone dyes, phthalocyanine dyes and the like.

The hot melt ink for ink jet printers according to the invention should be composed of the four essential ingredients described above (i.e., the normal temperature solid wax, organic substance, polymer material and coloring material). Intended effects cannot be obtained if any of these essential ingredients are omitted.

The four fundamental ingredients should be present in the following amounts. The normal temperature solid wax should preferably be present in an amount of from 50 to 99 wt. %, more preferably from 50 to 96 wt. % and, most preferably from 60 to 90 wt. %. If the content of the solid wax is less than 50 wt % the resultant hot melt ink may lose inherent properties of being solid at normal temperatures or may become thermally unstable.

The organic substance should preferably be present in an amount of from 0.1 to 48 wt. %, more preferably from 1 to 45 wt. % and, most preferably from 3 to 40 wt. %. The polymer material should also preferably be present in an amount of from 0.1 to 48 wt. %, more preferably from 1 to 45 wt. % and, most preferably from 3 to 40 wt. %. The coloring material should preferably be present in an amount of from 0.1 to 20 wt. %, more preferably from 0.5 to 10 wt. % and, most preferably from 1 to 8 wt. %. All amounts are based on the total weight of the ink composition.

A hot melt ink using pigments can be prepared in the following manner. Initially, an organic substance and a pigment, an organic substance, a polymer material and a pigment, or a normal temperature solid wax, an organic substance, a polymer material and a pigment are mixed and melted. The resultant mixture in a melted state is subjected to a dispersing machine such as a three-roll mill, an attritor, a ball mill or a colloid mill, to convert the pigment into fine particles and obtain a dispersion. Thereafter, the ingredients other than the pigment are added to the hot dispersion in conformity with the intended final ink composition. Finally, the composition in the form of a hot liquid is passed through a 10 μm or smaller mesh filter, to obtain the final ink.

A hot melt ink for ink jet printers which makes use of dyes can be prepared in the following manner. First, a normal temperature solid wax, an organic substance and a polymer material are melted under agitation by an agitator, followed by adding a dye while agitating, thereby obtaining a hot melt composition. The hot melt composition is then passed through a 10 μm or smaller mesh filter, to obtain the final ink.

The following examples describe hot melt inks for ink jet printers in which pigments are used.

EXAMPLE 1

The normal temperature solid wax used in this example is microcrystalline wax (Hi-Mic 2065 manufactured by NIPPON SEIRO CO., LTD., SP<8.5). A paraffin wax derivative (HAD 5080 manufactured by NIPPON SEIRO CO., LTD., SP>9.1) is used as an organic substance. A petroleum resin (NEOPOLYMER S manufactured by NIPPON PETROCHEMICALS CO., LTD., Mw=1100) is used as a polymer material. Carbon black (MA-100 manufactured by Mitsubishi Kasei Corporation) is used as a pigment.

The ink composition of this example has the following formulation.

| Hi-Mic 2065 | 73 parts by weight |
| --- | --- |
| HAD 5080 | 20 parts by weight |
| NEOPOLYMER S | 5 parts by weight |
| MA-100 | 2 parts by weight |

The ink can be prepared following a procedure illustrated in FIG. 1. More particularly, a paraffin wax derivative 2 (60 parts by weight) and carbon black 4 (40 parts by weight) are mixed under heating conditions at 100° C. The resultant mixture 5 is passed three times through three-roll mill 10 manufactured by INOUE MFG INC., which is a temperature-controlled three-roll mill under heating conditions of 80° C., thereby obtaining a dispersion.

Subsequently, the dispersion 6 (5 parts by weight) is thermally melted at 120° C., into which 73 parts by weight of microcrystalline wax 1, 17 parts by weight of the paraffin wax derivative 2 and 5 parts by weight of the petroleum resin 3 are added, followed by mixing under agitation.

Two or three drops of the resultant composition 7 are melted on a glass slide heated to 120° C., on which a glass cover plate is placed and pressed slightly, followed by observation through a microscope (XF-UNR manufactured by NIKON CORPORATION) using transmitted light. As a result, few particles are found in the melted state. This reveals that substantially all of the carbon black 4 is finely dispersed in size not larger than 1 μm. Thus, the dispersability of the pigment is good.

The composition 7 is filtered through a 1 μm mesh filter 9 of a heating filtration device manufactured by ADVANTEC TOYO CO., LTD., to obtain a final hot melt ink 8.

The hot melt ink 8 of Example 1 may be used as a hot melt ink for an ink jet printer. The hot melt ink 8 is black in color and solid at normal temperatures and is liquefied at temperatures not lower than 75° C. Measuring the ink's viscosity with a viscometer manufactured by BROOKFIELD ENGINEERING LABS. (LVTD-2+thermosel system) reveals that the viscosity is 39 cps. (centipoises) at 100° C. or 22 cps. at 125° C.

EXAMPLE 2

The normal temperature solid wax used in Example 2 is polyethylene wax (MITSUI HI-WAX 110 manufactured by Mitsui Petrochemical Industries, SP<9.0). A stearic acid amide (FATTY ACID AMIDE S manufactured by Kao Corporation, SP>9.86) is used as an organic substance. An ethylene-ethyl acrylate copolymer resin (A-701 manufactured by DUPONT-MITSUI POLYCHEMICALS CO., LTD., Mw=220,000) is used as a polymer material. A quinacridone pigment (HOSTAPERM PINK E02 TONERGRADE manufactured by Hoechst) is provided as a pigment.

The ink composition of Example 2 has the following formulation.

| MITSUI HI-WAX 110 | 79 parts by weight |
| --- | --- |
| FATTY ACID AMIDE S | 10 parts by weight |
| A-701 | 8 parts by weight |
| HOSTAPERM PINK E02 | 3 parts by weight |

The hot melt ink of Example 2 can be prepared in the following procedure. 70 parts by weight of the fatty acid amide S and 30 parts by weight of HOSTAPERM PINK E02 are melted under heating conditions of 100° C. and mixed. The resultant mixture is passed four times through the afore-indicated three-roll mill under heating conditions of 100° C., thereby obtaining a dispersion.

Subsequently, 10 parts by weight of the dispersion are thermally melted at 120° C. to which 79 parts by weight of MITSUI HI-WAX 110, 3 parts by weight of the fatty acid amide and 8 parts by weight of A-701 are added, followed by mixing under agitation.

Two or three drops of the resultant composition are melted on a glass slide heated to 120° C., on which a glass cover plate is placed and pressed slightly, followed by observation through a microscope (XF-UNR) using transmitted light. As a result, few particles are found in the melted state. This reveals that substantially all of the red quinacridone pigment, HOSTAPERM PINK E02, is finely dispersed in size not larger than 1 μm. Thus, the dispersability of the pigment is good.

The composition is filtered through a 1 μm mesh filter of a heating filtration device manufactured by ADVANTEC TOYO CO., LTD., to obtain a final hot melt ink.

The hot melt ink of Example 2 is usable as a hot melt ink for an ink jet printer. The hot melt ink is red in color and solid at a normal temperature and is liquefied at temperatures not lower than 100° C. Measuring the ink's viscosity with a viscometer (LVTD-2+thermosel system) reveals that the viscosity is 49 cps. at 125° C.

EXAMPLE 3

The normal temperature solid wax used in Example 3 is stearone (KAO WAX T-1 manufactured by Kao Corporation, SP=8.76). Oleic acid (REAGENT manufactured by Kanto Chemical Co., Ltd., SP>9.1) is used as an organic substance. A rosin resin (SUPER ESTER A-75 manufactured by ARAKAWA CHEMICAL INDUSTRIES, LIMITED Mw=970) is used as a polymer material. A phthalocyanine pigment (HELIOGEN BLUE K6911D manufactured by BASF) is provided as a pigment.

The ink composition of Example 3 has the following formulation.

| | |
|---|---|
| Kao Wax T-1 | 90 parts by weight |
| Oleic acid | 5 parts by weight |
| SUPER ESTER A-75 | 3 parts by weight |
| HELIOGEN BLUE K6911D | 2 parts by weight |

The hot melt ink of Example 3 can be prepared in the following procedure. 5 parts by weight of oleic acid and 2 parts by weight of HELIOGEN BLUE K6911D are mixed at a normal temperature, followed by passage three times through the afore-indicated three-roll mill at the normal temperature for dispersion.

7 parts by weight of the dispersion are heated to 120° C., to which 90 parts by weight of KAO WAX T-1 and 3 parts by weight of SUPER ESTER A-75 are added, followed by mixing under agitation.

Two or three drops of the resultant composition are melted on a glass slide heated to 120° C., on which a glass cover plate is placed and pressed slightly, followed by observation through a microscope (XF-UNR) using transmitted light. As a result, few particles are found in the melted state. This reveals that substantially all of the blue phthalocyanine pigment, HELIOGEN BLUE K6911D, is finely dispersed in size not larger than 1 μm. Thus, the dispersability of the pigment is good.

The composition is filtered through a 1 μm mesh filter of a heating filtration device manufactured by ADVANTEC TOYO CO., LTD., to obtain a final hot melt ink.

The hot melt ink of Example 3 may be used as a hot melt ink for an ink jet printer. The hot melt ink is blue in color and solid at normal temperatures and is liquefied at temperatures not lower than 80° C. Measuring the ink's viscosity with a viscometer (LVTD-2+thermosel system) reveals that the viscosity is 58 cps. at 100° C. or 29 cps. at 125° C.

EXAMPLE 4

The normal temperature solid wax used in Example 4 is paraffin wax (HNP-10 manufactured by NIPPON SEIRO CO., LTD., SP<8.0). A polyethylene wax derivative (POWAX H-10 manufactured by NIPPON OIL COMPANY, LIMITED, SP>9.2) is used as an organic substance. An ethylene-vinyl acetate copolymer resin (EVA 210 manufactured by DUPONT-MITSUI POLYCHEMICALS CO., LTD., Mw=65,000) is used as a polymer material. An iso-indolinone pigment (PALIOTOL YELLOW D1155 manufactured by BASF) is provided as a pigment.

The ink composition of Example 4 has the following formulation.

| | |
|---|---|
| HNP-10 | 82 parts by weight |
| POWAX H-10 | 10 parts by weight |
| EVA210 | 5 parts by weight |
| PALIOTOL YELLOW D1155 | 3 parts by weight |

The hot melt ink of Example 4 can be prepared in the following procedure. 40 parts by weight of HNP-10, 20 parts by weight of POWAX, 10 parts by weight of EVA210 and 30 parts by weight of PALIOTOL YELLOW D1155 are melted under heating conditions of 100° C. and mixed. The resultant mixture is passed three times through the afore-indicated three-roll mill under heating conditions of 75° C., thereby obtaining a dispersion.

Subsequently, 10 parts by weight of the dispersion are heated to 120° C., into which 78 parts by weight of HNP-10, 8 parts by weight of POWAX and 4 parts by weight of EVA210 are added, followed by mixing under agitation.

Two or three drops of the resultant composition are melted on a glass slide heated to 120° C., on which a glass cover plate is placed and pressed slightly, followed by observation through a microscope (XF-UNR) using transmitted light. As a result, few particles are found in the melted state. This reveals that substantially all of the yellow iso-indolinone pigment, PALIOTOL YELLOW D 1155, is finely dispersed in size not larger than 1 μm. Thus, the dispersability of the pigment is good.

The composition is filtered through a 1 μm mesh filter of a heating filtration device manufactured by ADVANTEC TOYO CO., LTD., to obtain a final hot melt ink.

The hot melt ink of Example 4 may be used as a hot melt ink for an ink jet printer. The hot melt ink is yellow in color and solid at a normal temperature and is liquefied at temperatures not lower than 75° C. Measuring the ink's viscosity with a viscometer (LVTD-2+thermosel system) reveals that the viscosity is 34 cps. at 100° C. or 16 cps. at 125° C.

Comparative Example 1

The ink of Comparative Example 1 has the following formulation.

| | |
|---|---|
| HNP-10 (paraffin wax) | 93 parts by weight |
| EVA210 (ethylene-vinyl acetate copolymer resin) | 5 parts by weight |
| MA-100 (carbon black) | 2 parts by weight |

The hot melt ink of Comparative Example 1 can be prepared in the following manner. 60 parts by weight of HNP-10 and 40 parts by weight of MA-100 are mixed under heating conditions of 100° C., followed by passage three times through the afore-indicated three-roll mill under heating conditions of 78° C., to obtain a dispersion.

5 parts by weight of the dispersion are heated to 120° C., to which 90 parts by weight of HNP-10 and 5 parts by weight of EVA210 are added and mixed under agitation.

Two or three drops of the resultant composition are placed and melted on a glass slide heated to 120° C., on which a glass cover is placed and pressed slightly, followed by observation through a microscope (XF-UNR) using transmitted light. As a result, the MA-100 pigment is found to be present substantially in the form of large particles in size not smaller than 1 $\mu$m. Thus, it is found that with the composition of Comparative Example 1, the pigment is not satisfactorily dispersed.

The hot melt ink of Comparative Example 1 lacks any organic substance, so that the pigment cannot be dispersed to a satisfactory extent. Thus, the ink cannot be used as a hot melt ink for ink jet printers.

Comparative Example 2

The ink of Comparative Example 2 has the following formulation.

| Hi-Mic 2065 | 97 parts by weight |
| HOSTAPERM PINK E02 | 3 parts by weight |

The hot melt ink of Comparative Example 2 can be prepared in the following manner. 70 parts by weight of Hi-Mic 2065 and 30 parts by weight of HOSTAPERM PINK E02 are mixed under heating conditions of 100° C., followed by passage three times through the afore-indicated three-roll mill under heating conditions of 75° C. to obtain a dispersion.

10 parts by weight of the dispersion are heated to 120° C., into which 90 parts by weight of Hi-Mic 2065 are added and mixed under agitation.

Two or three drops of the resultant composition are placed and melted on a glass slide heated to 120° C., on which a glass cover is placed and pressed slightly, followed by observation through a microscope (XF-UNR) using transmitted light. As a result, the HOSTAPERM PINK E02 pigment is found to be present substantially in the form of large particles in size not smaller than 1 $\mu$m. Thus, it is found that with the composition of Comparative Example 2, the pigment is not satisfactorily dispersed.

The hot melt ink of Comparative Example 2 lacks any organic substance or polymer material, so that the pigment cannot be dispersed to a satisfactory extent. Thus, the ink cannot be used as a hot melt ink for ink jet printers.

Comparative Example 3

The ink of Comparative Example 3 has the following formulation.

| KAO WAX T-1 | 93 parts by weight |
| Oleic acid | 5 parts by weight |
| HELIOGEN BLUE K6911D | 2 parts by weight |

The hot melt ink of comparative Example 3 can be prepared in the following manner. 60 parts by weight of oleic acid and 40 parts by weight HELIOGEN BLUE K6911D are mixed at normal temperatures, followed by passage three times through the afore-indicated three-roll mill at normal temperatures.

5 parts by weight of the resultant dispersion are heated to 120° C., into which 93 parts by weight of Kao Wax T-1 and 2 parts by weight of oleic acid are added and mixed under agitation.

Two or three drops of the resultant composition are placed and melted on a glass slide heated to 120° C., on which a cover glass is placed and pressed slightly, followed by observation through a microscope (XF-UNR) using transmitted light. As a result, few particles are observed and substantially all of the pigment, HELIOGEN BLUE K6911D, is found to be finely dispersed in size not larger than 1 $\mu$m, with good pigment dispersability.

The composition is filtered through a 1 $\mu$m mesh filter of a heating filtration device manufactured by ADVANTEC TOYO CO., LTD., to obtain a final hot melt ink.

The hot melt ink of Comparative Example 3 may be used as a hot melt ink for ink jet printers. Due to the lack of polymer materials, however, the ink's dispersion stability is poor. When the ink is used in a hot liquefied state over a long time, problems arise such as changes in print color, clogging of the orifice of the printing head and changes in the ink's physical properties.

Comparative Example 4

The ink of Comparative Example 4 has the following formulation.

| POWAX H-10 | 98 parts by weight |
| PALIOTOL YELLOW D1155 | 2 parts by weight |

The hot melt ink of Comparative Example 4 can be prepared in the following manner. 60 parts by weight of POWAX and 40 parts by weight of PALIOTOL YELLOW D1155 are mixed under heating conditions of 100° C., followed by passage three times through the afore-indicated three-roll mill under heating conditions of 75° C.

5 parts by weight of the resultant dispersion are heated to 120° C., into which 95 parts by weight of POWAX are added and mixed under agitation.

Two or three drops of the resultant composition are placed and melted on a glass slide heated to 120° C., on which a glass cover is placed and pressed slightly, followed by observation through a microscope (XF-UNR) using transmitted light. As a result, few particles are observed and substantially all of the pigment, PALIOTOL YELLOW D1155, is found to be finely dispersed in size not larger than 1 $\mu$m with good pigment dispersability.

The composition is filtered through a 1 $\mu$m mesh filter of a heating filtration device manufactured by ADVANTEC TOYO CO., LTD., to obtain a final hot melt ink.

The hot melt ink of Comparative Example 4 may be used as a hot melt ink for ink jet printers. Since the normal temperature wax and polymer material are not present, however, the ink exhibits poor thermal stability. Also, due to the ink's poor dispersion stability, when the ink is used in a hot liquefied state over a long time, problems arise such as changes in print color, clogging of the orifice of the printing head and changes in the ink's physical properties.

Comparative Example 5

The ink of Comparative Example 5 has the following formulation.

| HAD 5080 | 93 parts by weight |
| --- | --- |
| EVA 210 | 5 parts by weight |
| MA-100 | 2 parts by weight |

The hot melt ink of Comparative Example 5 can be prepared in the following manner. 60 parts by weight of MAD 5080 and 40 parts by weight of MA-100 are mixed under heating conditions of 100° C., followed by passage three times through the afore-indicated three-roll mill at 75° C.

5 parts by weight of the resultant dispersion are heated to 120° C., into which 90 parts by weight of HAD 5080 and 5 parts by weight of EVA 210 are added and mixed under agitation.

Two or three drops of the resultant composition are placed and melted on a glass slide heated to 120° C. on which a glass cover is placed and pressed slightly, followed by observation through a microscope (XF-UNR) using transmitted light. As a result, few particles are observed and substantially all of the pigment, HELIOGEN BLUE K6911D, is found to be finely dispersed in size not larger than 1 μm with good pigment dispersability.

The composition is filtered through a 1 μm mesh filter of a heating filtration device manufactured by ADVANTEC TOYO CO., LTD., to obtain a final hot melt ink.

The hot melt ink of Comparative Example 5 may be used as a hot melt ink for ink jet printers. Due to the lack of the normal temperature wax and polymer material, however, the ink exhibits poor thermal stability. Also, due to the lack of normal temperature solid waxes, the ink is poor in thermal stability. When the ink is used in a hot liquefied state over a long time, problems arise such as changes in print color, clogging of the orifice of the printing head and changes in the ink's physical properties.

The pigment dispersion stability of the hot melt inks of Examples 1 to 4 and Comparative Examples 3 to 5 was determined according to the following procedure.

Figure 2:
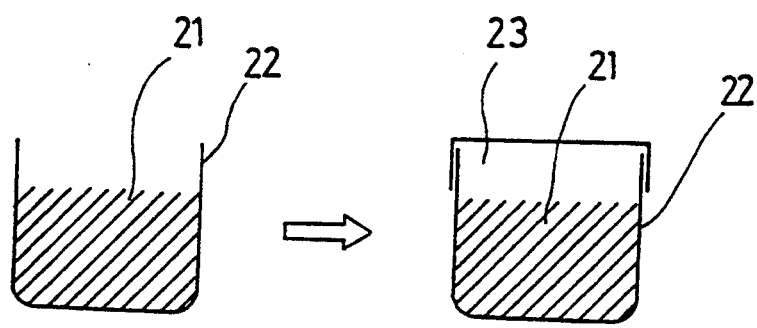
FIG. 2 is a schematic view showing a procedure for a heat storage test.

As shown in FIG. 2, an ink sample 21 is poured into a glass container 22 under heating conditions of 125° C., in which nitrogen gas 23 is filled, followed by hermetic sealing and storage at 125° C. over 30 days. The densities of the supernatant liquid of the ink sample before and after storage are determined using a densitometer system (DMA 48) manufactured by ANTON PAAR K.G.

The results of the measurement reveal that a smaller difference in density of the ink sample before and after storage is considered to provide better dispersion stability. If the density of the ink sample after storage is smaller than that of the ink before storage, a greater difference in density can be judged as being poorer in dispersion stability. Moreover, the difference in viscosity of the ink sample as will be produced by the storage test may be used to judge the ink's dispersion stability. Accordingly, the viscosity at 125° C. before and after the storage is determined using a viscometer (LVTD-2+thermosel system). A smaller difference in ink viscosity before and after storage is evaluated as being better in dispersion stability.

In the storage test, the following blank test is first conducted. The pigments only are removed from the compositions of Examples 1 to 4 and Comparative Examples 3 to 5. Seven blank compositions are subjected to the storage test. As a result, it is found that the density fluctuates only within a range of ±0.2% for all of the blank compositions and the viscosity fluctuates within a range of ±1.5% for all of the blank compositions.

Next, the hot melt inks of Examples 1 to 4 and Comparative Example 5 are subjected to the storage test. In all the inks of the examples, the variations in ink density after storage relative to those before storage are within −0.4%. With regard to viscosity, the variations in ink viscosity after storage relative to those before storage are within ±4%.

From these results, the pigment dispersion stability test is considered to appropriately detect a variation in the dispersed state of the respective pigments, from which it will be seen that the influence is very small. Accordingly, the hot melt inks of Examples 1 to 4 and Comparative Example 5 are considered to have satisfactory pigment dispersion stability.

In contrast, when the hot melt inks of Comparative Examples 3 and 4 are subjected to the storage test, the density after storage relative to that before storage varies in a range of not less than −2% for both Comparative Examples 3 and 4. On the other hand, the viscosity after storage relative to that before storage varies at not less than +8% for both Comparative Examples 3 and 4.

Thus, the hot melt inks of Comparative Examples 3 and 4 are significantly inferior in pigment dispersion stability compared to the inks of Examples 1 to 4 and Comparative Example 5.

The heat stability of the hot melt inks of Examples 1 to 4 and Comparative Examples 4 and 5 are determined according to the following procedure.

As shown in FIG. 2, ink sample 21 is poured into a glass container 22 under heating conditions of 125° C. and kept at 125° C. for 30 days without sealing container 22 with a stopper. The viscosity of the ink sample 21 at 125° C. before and after storage is measured using the afore-indicated viscometer.

As a result, it is found that the hot melt inks of Examples 1 to 4 have a variation in viscosity within +10%. In contrast, both hot melt inks of Comparative Examples 4 and 5 exhibit a variation in viscosity not less than +15%. These results reveal that the hot melt inks of Examples 1 to 4 have a good heat resistance, whereas the heat resistance of the inks of Comparative Examples 4 and 5 are significantly inferior.

The dispersability and dispersion stability of the respective pigments and the heat stability of the inks in Examples 1 to 4 and Comparative Examples 1 to 5 are summarized in the Table of FIG. 3.

The following examples illustrate the preparation of hot melt inks using dyes.

Example A

The normal temperature solid wax used in Example A is polyethylene wax (MITSUI HI-WAX 1100 manufactured by Mitsui Petrochemical Industries, Ltd., SP<9.0). A stearic acid amide (FATTY ACID AMIDS manufactured by Kao Corporation, SP=9.86) is used as an organic substance. An ethylene-ethyl acrylate copolymer resin (A-701 manufactured by DUPONT-MITSUI POLYCHEMICALS CO., LTD., Mw=970) is used as a polymer material. SOLVENT BLUE 35

(FAT BLUE B manufactured by Hoechst) is used as the dye. The ink composition of this example has the following formulation.

| | |
|---|---|
| MITSUI HI-WAX 110 | 79 parts by weight |
| Stearic acid amide S | 10 parts by weight |
| A-701 | 10 parts by weight |
| FAT BLUE B | 1 part by weight |

The hot melt ink of Example A can be prepared according to the following procedure. 79 parts by weight of Mitsui HI-WAX 110, 10 parts by weight of FATTY ACID AMIDES and 10 parts by weight of A-701 are mixed and melted by heating at 120° C., to obtain a uniform mixture. Thereafter, 1 part by weight of FAT BLUE B is added to the mixture, followed by further mixing under agitation.

Two or three drops of the resultant composition are placed and melted on a glass slide heated to 120° C. on which a glass cover plate is placed and pressed slightly, followed by observation through a microscope (XF-UNR) using transmitted light. As a result, no particles are found in the melted state. This reveals that substantially all of the FAT BLUE B dye is dissolved with good dye solubility.

The composition is filtered through a 1 μm mesh filter of a heating filtration device manufactured by ADVANTEC TOYO CO., LTD., to obtain a final hot melt ink.

The hot melt ink of Example A may be used as a hot melt ink for ink jet printers. The hot melt ink is dark blue in color and solid at normal temperatures and is liquefied at temperatures not lower than 100° C. Measuring the viscosity with a viscometer (LVTD-2+thermosel system) reveals that the ink's viscosity is 46 cps. at 125° C.

Example B

The normal temperature solid wax contained in the hot melt ink of Example B is paraffin wax (HNP-10 manufactured by NIPPON SEIRO CO., LTD.). A polyethylene wax derivative (POWAX H-10 manufactured by NIPPON OIL COMPANY, LIMITED) is used as an organic substance. An ethylene-vinyl acetate copolymer resin (EVA 210 manufactured by DU-PONT-MITSUI POLYCHEMICALS CO., LTD., Mw=65 000) is used as a polymer material. A solvent yellow dye of SOLVENT YELLOW 3G (FAT YELLOW 3G manufactured by Hoechst) is provided as a dye.

The ink composition of this example has the following formulation.

| | |
|---|---|
| HNP-10 | 84 parts by weight |
| POWAX H-10 | 10 parts by weight |
| EVA 210 | 5 parts by weight |
| FAT YELLOW 3G | 1 part by weight |

The hot melt ink of Example B can be prepared in the following procedure. 84 parts by weight of HNP-10, 10 parts by weight of POWAX and 5 parts by weight of EVA 210 are melted by heating at 100° C. and mixed.

Thereafter, 1 part by weight of FAT YELLOW 3G is added to the mixture, followed by further mixing under agitation to melt the materials.

Two or three drops of the resultant composition are placed and melted on a glass slide heated to 120° C., on which a glass cover plate is placed and pressed slightly, followed by observation through a microscope (XF-UNR) using transmitted light. As a result, no particles are found in the melted state. This reveals that substantially all of the FAT YELLOW 3G dye is dissolved with good dye solubility.

The composition is filtered through a 1 μm mesh filter of a heating filtration device manufactured by ADVANTEC TOYO CO., LTD., to obtain a final hot melt ink.

The hot melt ink of Example B may be used as a hot melt ink for ink jet printers. The hot melt ink is yellow in color and solid at normal temperatures and is liquefied at temperatures not lower than 75° C. Measuring the viscosity with a viscometer (LVTD-2+thermosel system) reveals that the ink's viscosity is 13 cps. at 125° C.

Thus, according to these examples, hot melt inks may be provided which have good dispersability and pigment dispersion stability as well as good dye fusibility and heat stability. The hot melt inks also have good coloring power and good color fastness to light. When the inks are used over a long time, no problems occur in regard to coagulation and settling of the coloring material or degradation of the ink.

In contrast, if the normal temperature solid wax is omitted from the four fundamental ingredients (normal temperature solid wax, organic substance, polymer material and coloring material) or if the wax content is less than 50% by weight, fundamental characteristics of the hot melt ink may be lost. For instance, the ink may become poor in heat stability. Alternatively, if an organic substance is not present, the pigment dispersability becomes unsatisfactory, making it impossible to obtain an intended ink color while causing clogging of the ink jet head. If a polymer material is omitted, the pigment dispersion stability is degraded and thus the ink becomes unstable over time. If a pigment is omitted, high coloring power and color fastness to light are not achieved.

A second embodiment of the invention is described in which the ingredients and parameters are similar to those of the first embodiment and thus are not described except that differences from the first embodiment are described.

The normal temperature solid waxes used in the second embodiment should preferably have an SP not larger than 9.50, more preferably not larger than 9.0 and, most preferably, not larger than 8.5.

In the second embodiment, the standard deviation (SD) of the distribution in the number of carbon atoms in the normal temperature solid wax should preferably have a value not larger than 3.3, more preferably not larger than 3.2 and, most preferably, not larger than 3.1.

The reasons why the SP and SD are preferably in the above-defined ranges are as follows: when the SP is larger than 9.51 or the SD exceeds 3.3, the evaporation of the ink during storage under heating conditions is not negligible due to a significant increase in the amount of low molecular weight components, resulting in thermal instability. More particularly, the ink suffers significant degradation when heated over a long time.

The normal temperature solid waxes used in the second embodiment include, aside from those waxes used in the first embodiment, higher fatty acids, of which behenic acid, stearic acid, palmitic acid or myristic acid is preferred, higher alcohols, of which stearyl alcohol or behenyl alcohol is preferred, and modified waxes, of which paraffin wax derivatives are preferred. These waxes may be used singly or in combination.

The organic substances used in the second embodiment include, aside from those used in the first embodiment, methyl stearate, octadecyl stearate and the like.

The following examples illustrate hot melt inks for ink jet printers according to the second embodiment.

Example 5

A normal temperature solid wax used in Example 5 is stearic acid (Lunac S-90 manufactured by Kao Corporation, SP=9.2 and SD<3.0). A polyethylene wax derivative (POWAX H-10 manufactured by NIPPON OIL COMPANY, LIMITED, SP>9.2) is used as an organic substance. A rosin resin (Super Ester A-75 manufactured by ARAKAWA CHEMICAL INDUSTRIES, LIMITED, Mw=970) is used as a polymer material. Carbon black (MA-7 manufactured by Mitsubishi Kasei Corporation) is provided as a pigment.

The ink composition of Example 5 has the following formulation.

| Lunac S-90 | 73 parts by weight |
| POWAX H-10 | 22 parts by weight |
| SUPER ESTER A-75 | 3 parts by weight |
| MA-7 | 2 parts by weight |

The hot melt ink of Example 5 can be prepared according to the procedure shown in FIG. 1. The polyethylene wax derivative 2 (60 parts by weight) and carbon black 4 (40 parts by weight) are mixed under heating conditions of 100° C., to obtain a mixture 5. The resultant mixture 5 is passed three times through three-roll mill 10, which is a temperature-controlled three roll mill of INOUE MFG INC., under heating conditions of 75° C., thereby obtaining a dispersion 6.

Subsequently, the dispersion 6 (5 parts by weight) is heated to 120° C., to which 73 parts by weight of stearic acid 1, 19 parts by weight of the polyethylene wax derivative 2 and 3 parts by weight of the rosin resin 3 are added, followed by mixing under agitation.

Two or three drops of the resultant composition are melted on a glass slide heated to 120° C., on which a glass cover plate is placed and pressed slightly, followed by observation through a microscope (XF-UNR) using transmitted light. As a result, few particles are found in the melted state. This reveals that substantially all of the carbon black 4 is finely dispersed in size not larger than 1 μm. Thus, the dispersability of the pigment is good.

The composition is filtered through a 1 μm mesh filter 9 of a heating filtration device manufactured by ADVANTEC TOYO CO., LTD., to obtain a final hot melt ink 8.

The hot melt ink of Example 5 may be used as a hot melt ink for ink jet printers. The hot melt ink 8 is black in color and solid at normal temperatures. The ink is melted and liquefied at temperatures not lower than 68° C. Measuring the ink's viscosity with a viscometer (LVTD-2+thermosel system) reveals that the viscosity is 32 cps. at 125° C.

Example 6

The normal temperature solid wax used in Example 6 is paraffin wax (HNP-10 manufactured by NIPPON SEIRO CO., LTD., SP<8.0 and SD=3.1). A stearic acid amide (FATTY ACID AMIDE S manufactured by Kao Corporation, SP=9.86) is used as the organic substance. An ethylene-ethyl acrylate copolymer resin (A-701 manufactured by DUPONT-MITSUI POLYCHEMICALS CO., LTD., Mw=220,000) is used as the polymer. A quinacridone pigment (HOSTAPERM PINK E02 TONERGRADE manufactured by Hoechst) is used as the pigment.

The ink composition of Example 6 has the following formulation.

| HNP-10 | 79 parts by weight |
| FATTY ACID AMIDE S | 10 parts by weight |
| A-701 | 8 parts by weight |
| HOSTAPERM PINK E02 | 3 parts by weight |

The hot melt ink of Example 6 can be prepared according to the following procedure. 70 parts by weight of the fatty acid amide S and 30 parts by weight of HOSTAPERM PINK E02 are melted and mixed under heating conditions of 100° C. to obtain a mixture The resultant mixture is passed four times through a three-roll mill under heating conditions of 85° C., to obtain a dispersion.

Subsequently, 10 parts by weight of the dispersion is heated to 120° C. to which 79 parts by weight of HNP-10 3 parts by weight of the fatty acid amide S and 8 parts by weight of A-701 are added, followed by mixing under agitation.

Two or three drops of the resultant composition are melted on a glass slide heated to 120° C., on which a glass cover plate is placed and pressed slightly, followed by observation through a microscope (XF-UNR) using transmitted light. As a result, few particles are found in the melted state. This reveals that substantially all of the red quinacridone pigment, HOSTAPERM PINK E02, is finely dispersed in size not larger than 1 μm. Thus, the dispersability of the pigment is good.

The composition is filtered through a 1 μm mesh filter of a heating filtration device manufactured by ADVANTEC TOYO CO., LTD., to obtain a final hot melt ink.

The hot melt ink of Example 6 may be used as a hot melt ink for ink jet printers. The hot melt ink is red in color and solid at normal temperatures. The ink is melted and liquefied at temperatures not lower than 77° C. Measuring the ink's viscosity with a viscometer (LVTD-2+thermosel system) reveals that the viscosity is 21 cps. at 125° C.

Example 7

The normal temperature solid wax used in Example 7 is stearone (KAO WAX T-1 manufactured by Kao Corporation, SP=8.76 and SD<3.0). Oleic acid (reagent manufactured by KANTO CHEMICAL CO., LTD., SP>9.1) is used as an organic substance. A rosin resin (SUPER ESTER A-75 manufactured by ARAKAWA CHEMICAL INDUSTRIES, LIMITED, Mw=970) is used as a polymer. A phthalocyanine pigment (HELIOGEN BLUE K6911D manufactured by BASF) is used as a pigment.

The ink composition of Example 7 has the following formulation.

| KAO WAX T-1 | 90 parts by weight |
| OLEIC ACID | 5 parts by weight |
| SUPER ESTER A-75 | 3 parts by weight |

| | |
|---|---|
| HELIOGEN BLUE K6911D | 2 parts by weight |

The hot melt ink of Example 7 can be prepared according to the following procedure. 5 parts by weight of oleic acid and 2 parts by weight of HELIOGEN BLUE K6911D are mixed at normal temperatures, followed by passage three times through a three-roll mill at normal temperatures to obtain a dispersion.

Subsequently, 7 parts by weight of the dispersion is melted by heating to 120° C., to which 90 parts by weight of KAO WAX T-1 and 3 parts by weight of SUPER ESTER A-75 are added, followed by mixing under agitation.

Two or three drops of the resultant composition are melted on a glass slide heated to 120° C., on which a glass cover plate is placed and pressed slightly, followed by observation through a microscope (XF-UNR) using transmitted light. As a result, few particles are found in the melted state. This reveals that substantially all of the blue phthalocyanine pigment, HELIOGEN BLUE K6911D, is finely dispersed in size not larger than 1 μm. Thus, the dispersability of the pigment is good.

The composition is filtered through a 1 μm mesh filter of a heating filtration device manufactured by ADVANTEC TOYO CO., LTD., to obtain a final hot melt ink.

The hot melt ink of Example 7 is usable as a hot melt ink for ink jet printers. The hot melt ink is blue in color and solid at normal temperatures. The ink is melted and liquefied at temperatures not lower than 80° C. Measuring the ink's viscosity with a viscometer (LVTD-2+thermosel system) reveals that the viscosity is 29 cps. at 125° C.

Example 8

The normal temperature solid wax used in Example 8 is paraffin wax (HNP-10 manufactured by NIPPON SEIRO CO., LTD., SP<8.0). A polyethylene wax derivative (POWAX H-10 manufactured by NIPPON OIL COMPANY, LIMITED, SP>9.2) is used as an organic substance. An ethylene-vinyl acetate copolymer resin (EVA 210 manufactured by DUPONT-MITSUI POLYCHEMICALS CO., LTD., Mw=65,000) is used as a polymer material. An iso-indolinone pigment (PALIOTOL YELLOW D1155 manufactured by BASF) is provided as a pigment.

The ink composition of Example 8 has the following formulation.

| | |
|---|---|
| HNP-10 | 82 parts by weight |
| POWAX H-10 | 10 parts by weight |
| EVA210 | 5 parts by weight |
| PALIOTOL YELLOW D1155 | 3 parts by weight |

The hot melt ink of Example 8 can be prepared in the following procedure. 40 parts by weight of HNP-10, 20 parts by weight of POWAX, 10 parts by weight of EVA210 and 30 parts by weight of PALIOTOL YELLOW D1155 are melted under heating conditions of 100° C. and mixed. The resultant mixture is passed three times through a three-roll mill under heating conditions of 75° C., thereby obtaining a dispersion.

Subsequently, 10 parts by weight of the dispersion are heated to 120° C., into which 78 parts by weight of HNP-10, 8 parts by weight of POWAX and 4 parts by weight of EVA210 are added, followed by mixing under agitation.

Two or three drops of the resultant composition are melted on a glass slide heated to 120° C. on which a glass cover plate is placed and pressed slightly, followed by observation through a microscope (XF-UNR) using transmitted light. As a result, few particles are found in the melted state. This reveals that substantially all of the yellow iso-indolinone pigment, PALIOTOL YELLOW D 1155, is finely dispersed in size not larger than 1 μm. Thus, the dispersability of the pigment is good.

The composition is filtered through a 1 μm mesh filter of a heating filtration device manufactured by ADVANTEC TOYO CO., LTD., to obtain a final hot melt ink.

The hot melt ink of Example 8 may be used as a hot melt ink for an ink jet printer. The hot melt ink is yellow in color and solid at a normal temperature. The ink is liquefied at temperatures not lower than 75° C. Measuring the ink's viscosity with a viscometer (LVTD-2+thermosel system) reveals that the viscosity is 34 cps. at 100° C. or 16 cps. at 125° C.

Comparative Example 6

The ink of Comparative Example 6 has the following formulation.

| | |
|---|---|
| HNP-10 (paraffin wax) | 93 parts by weight |
| EVA210 (ethylene-vinyl acetate copolymer resin manufactured by DUPONT-MITSUI POLYCHEMICALS CO., LTD.) | 5 parts by weight |
| MA-7 (carbon black) | 2 parts by weight |

The hot melt ink of Comparative Example 6 can be prepared in the following manner. 60parts by weight of HNP-10 and 40 parts by weight of MA-100 are mixed under heating conditions of 100° C., followed by passage three times through the afore-indicated three-roll mill under heating conditions of 78° C. to obtain a dispersion.

5 parts by weight of the dispersion are heated to 120° C., to which 90 parts by weight of HNP-10 and 5 parts by weight of EVA210 are added and mixed under agitation.

Two or three drops of the resultant composition are placed and melted on a glass slide heated to 120° C. on which a glass cover is placed and pressed slightly, followed by observation through a microscope (XF-UNR) using transmitted light. As a result, the MA-100 pigment is found to be present substantially in the form of large particles in size not smaller than 1 μm. Thus, it is found that, with the composition of Comparative Example 6, the pigment is not satisfactorily dispersed.

The hot melt ink of Comparative Example 6 lacks any organic substance, so that the pigment cannot be dispersed to a satisfactory extent. Thus, the ink cannot be used as a hot melt ink for ink jet printers.

Comparative Example 7

The ink of Comparative Example 7 has the following formulation.

| | |
|---|---|
| Lunac S-90 | 97 parts by weight |

| HOSTAPERM PINK E02 | 3 parts by weight |
|---|---|

The hot melt ink of Comparative Example 7 can be prepared in the following manner. 70 parts by weight of Lunac S-90 and 30 parts by weight of HOSTAPERM PINK E02 are mixed under heating conditions of 100° C., followed by passage three times through the afore-indicated three-roll mill under heating conditions of 75° C., to obtain a dispersion.

10 parts by weight of the dispersion are heated to 120° C. to which 90 parts by weight of Lunac S-90 are added and mixed under agitation.

Two or three drops of the resultant composition are placed and melted on a glass slide heated to 120° C., on which a glass cover is placed and pressed slightly, followed by observation through a microscope (XF-UNR) using transmitted light.

As a result, the Lunac S-90 is found to be present substantially in the form of large particles not smaller than 1 μm in size. Thus, with the composition of Comparative Example 7, the pigment is not satisfactorily dispersed.

The hot melt ink of Comparative Example 7 lacks any organic substance or polymer material, so that the pigment cannot be dispersed to a satisfactory extent. Thus, the ink cannot be used as a hot melt ink for ink jet printers.

Comparative Example 8

The ink of Comparative Example 8 has the following formulation.

| KAO WAX T-1 (STEARONE manufactured by Kao Corporation) | 93 parts by weight |
|---|---|
| Oleic acid (reagent manufactured by KANTO CHEMICAL CO. LTD.) | 5 parts by weight |
| HELIOGEN BLUE K6911D (phthalocyanine pigment) | 2 parts by weight |

The hot melt ink of Comparative Example 8 can be prepared in the following manner. 60 parts by weight of oleic acid and 40 parts by weight of HELIOGEN BLUE K6911D are mixed at normal temperatures, followed by passage three times through the afore-indicated three-roll mill at normal temperatures.

5 parts by weight of the resultant dispersion are heated to 120° C., to which 93 parts by weight of KAO WAX T-1 and 2 parts by weight of oleic acid are added and mixed under agitation.

Two or three drops of the resultant composition are placed and melted on a glass slide heated to 120° C. on which a glass cover is placed and pressed slightly, followed by observation through a microscope (XF-UNR) using transmitted light. As a result, few particles are observed and substantially all of the pigment, HELIOGEN BLUE K6911D, is found to be finely dispersed in size not larger than 1 μm with good pigment dispersability.

The composition is filtered through a 1 μm mesh filter of a heating filtration device manufactured by ADVANTEC TOYO CO., LTD., to obtain a final hot melt ink.

The hot melt ink of Comparative Example 8 may be used as a hot melt ink for ink jet printers. Due to the lack of polymer materials, however, the ink's dispersion stability is poor. When the ink is used in a hot liquefied state over a long time, problems arise such as changes in print color, clogging of the orifice of a printing head and changes in the ink's physical properties.

Comparative Example 9

The ink of Comparative Example 9 has the following formulation.

| HNP-10 | 32 parts by weight |
|---|---|
| POWAX H-10 | 63 parts by weight |
| SUPER ESTER 1-75 | 3 parts by weight |
| PALIOTOL YELLOW D1155 | 2 parts by weight |

The hot melt ink of Comparative Example 9 can be prepared in the following manner. 60 parts by weight of POWAX and 40 parts by weight of PALIOTOL YELLOW D1155 are mixed under heating conditions of 100° C., followed by passage three times through the afore-indicated three-roll mill under heating conditions of 75° C.

5 parts by weight of the resultant dispersion are heated to 120° C., to which 60 parts by weight of POWAX, 32 parts by weight of HNP-10 and 3 parts by weight of SUPER ESTER A-75 are added and mixed under agitation.

Two or three drops of the resultant composition are placed and melted on a glass slide heated to 120° C., on which a glass cover is placed and pressed slightly, followed by observation through a microscope (XF-UNR) using transmitted light. As a result, few particles are observed and substantially all of the pigment, PALIOTOL YELLOW D1155, is found to be finely dispersed in size not larger than 1 μm with good pigment dispersability.

The composition is filtered through a 1 μm mesh filter of a heating filtration device manufactured by ADVANTEC TOYO CO., LTD., to obtain a final hot melt ink.

The hot melt ink of Comparative Example 9 may be used as a hot melt ink for ink jet printers. However, because the content of the normal temperature wax is less than 50% by weight, the ink exhibits poor thermal stability. When the ink is used in a hot liquefied state over a long time, problems arise such as changes in print color, clogging of the orifice of a printing head and changes in the ink's physical properties.

Comparative Example 10

The ink of Comparative Example 10 has the following formulation.

| Paracohol 5000 (Paraffin wax derivative manufactured by NIPPON SEIRO CO., LTD., SP = 9.2 and SD > 3.3) | 83 parts by weight |
|---|---|
| FATTY ACID AMIDE S | 10 parts by weight |
| EVA 210 | 5 parts by weight |
| MA-7 | 2 parts by weight |

The hot melt ink of Comparative Example 10 can be prepared in the following manner. FATTY ACID AMIDES (60 parts by weight) and MA-7 (40 parts by weight) are mixed under heating conditions of 100° C., followed by passage three times through the afore-indicated three-roll mill at 85° C.

5 parts by weight of the resultant dispersion are heated to 120° C., to which 83 parts by weight of Paracohol 5000, 7 parts by weight of FATTY ACID AMIDES and 5 parts by weight of EVA 2 are added and mixed under agitation.

Two or three drops of the resultant composition are placed and melted on a glass slide heated to 120° C. on which a glass cover is placed and pressed slightly, followed by observation through a microscope (XF-UNR) using transmitted light. As a result, few particles are observed and substantially all of the MA-7 pigment is found to be finely dispersed in size not larger than 1 μm with good pigment dispersability.

The hot melt ink of Comparative Example 10 may be used as a hot melt ink for ink jet printers. Since the SD exceeds 3.5, low molecular weight components are contained in large amounts. Accordingly, the ink exhibits poor heat stability. When the ink in a hot liquefied state is used over a long time, problems arise such as changes in print color, clogging of the orifice of a printing head and changes in the ink's physical properties.

The pigment dispersion stability of the hot melt inks of Examples 5 to 8 and Comparative Examples 6 to 10 is determined according to the following procedure.

As shown in FIG. 2, an ink sample 21 is poured into a glass container 22 under heating conditions of 125° C. in which nitrogen gas 23 is filled followed by hermetic sealing and storage at 125° C. over 30 days. The densities of the supernatant liquid of the ink sample before and after storage are determined using a densitometer system (DMA 48) manufactured by ANTON PAAR K. G. The results of the measurements reveal that a smaller difference in density of the ink sample before and after storage provides better dispersion stability. If the density of the ink sample after storage is smaller than that of the ink before storage, a greater difference in density is judged as being poorer in dispersion stability. Moreover, the difference in viscosity of the ink sample as will be produced by the storage test may be used to judge the ink's dispersion stability. The viscosity at 125° C. before and after storage is determined using a viscometer (LVTD-2+thermosel system). From this, a smaller difference in ink viscosity before and after storage can be evaluated as being better in dispersion stability.

In the storage test, the following blank test is first conducted. The pigments are removed from the compositions of Examples 5 to 8 and Comparative Examples 8 to 10. Seven blank compositions are subjected to the storage test. As a result, it is found that the density fluctuates only within a range of ±0.2% for all of the blank compositions and that the viscosity fluctuates within a range of ±1.5% for all of the blank compositions.

Next, the hot melt inks of Examples 5 to 9 and Comparative Examples 9 and 10 are subjected to the storage test. In all the inks of the examples, the variation in the ink density after storage relative to those before storage is within −0.4%. With regard to the viscosity, the variation in viscosity of the inks after storage relative to those before storage is within ±4%.

From these results, the pigment dispersion stability test is considered to appropriately detect a variation in the dispersed state of the respective pigments, from which it will be seen that the influence is very small. Accordingly, the hot melt inks of Examples 5 to 8 and Comparative Examples 9 and 10 are considered to have satisfactory pigment dispersion stability.

In contrast, when the hot melt ink of Comparative Example 8 is subjected to the storage test, the density after storage relative to that before storage varies in a range of not less than −2%. On the other hand, the viscosity after storage relative to that before storage varies at not less than +8%.

Thus, the hot melt ink of Comparative Example 8 is significantly inferior in pigment dispersion stability compared to the inks of Examples 5 to 8 and Comparative Examples 9 and 10.

The hot melt inks of Examples 5 to 8 and Comparative Examples 9 and 10 are then subjected to a determination of heat stability according to the following procedure.

As shown in FIG. 2, ink sample 21 is poured into a glass container 22 under heating conditions of 125° C. and kept at 125° C. for 30 days without sealing the container with a stopper. The viscosity of the ink sample 21 at 125° C. before and after storage is measured by means of a viscometer.

As a result, it is found that the hot melt inks of Examples 5 to 8 have a variation in viscosity within +10%. In contrast, both hot melt inks of Comparative Examples 9 and 10 exhibit a variation in viscosity of not less than +15%. These results reveal that the hot melt inks of Examples 5 to 8 have a good heat resistance, whereas the heat resistances of the inks of Comparative Examples 9 and 10 are significantly inferior.

The dispersability and dispersion stability of the respective pigments, and the heat stability of the inks in Examples 5 to 8 and Comparative Examples 6 to 10, are summarized in the table of FIG. 4.

Thus, according to this embodiment, hot melt inks may be provided having good dispersability and pigment dispersion stability, good dye fusibility and good heat stability. The hot melt inks also have good coloring power and good color fastness to light. When the inks are used over a long time, no problems are caused by coagulation and settlement of the coloring material or by degradation of the ink.

In contrast, if the normal temperature solid wax is omitted from the four fundamental ingredients or if the wax content is less than 50% by weight, problems arise such that fundamental characteristics of the hot melt ink may be lost. For instance, the ink may exhibit poor heat stability. Alternatively, if an organic substance is not present, the pigment dispersability becomes unsatisfactory, making it impossible to provide an intended color needed for the ink and causing clogging of the ink jet head. If a polymer material is not present, the pigment dispersion stability is degraded, causing the ink to become unstable over time. If a pigment is omitted, high coloring power and color fastness to light are not achieved.

The hot melt inks according to the invention are not limited to the preferred embodiments and examples described above. Various modifications may be made without departing from the scope of the invention as defined by the appended claims.

For instance, the four fundamental ingredients may be used not only singly but also in combinations of two or more. Moreover, additives other than the fundamental ingredients may be added singly or in combination, such as dyes for color control, viscosity modifiers, self-adhesion or adhesion imparting agents, pigment dispersants, heat characteristic modifiers, surface tension modifiers, gloss agents, hardness modifiers, crystallinity modifiers, plasticizers, surface friction modifiers, transparency imparting agents and the like.

What is claimed is:

1. A hot melt ink for an ink jet printer, comprising:
   a solid wax that is solid at normal temperatures, the solid wax having a solubility parameter equal to or less than 9.50, the solid wax being present in an amount of 50% by weight or more;
   an organic substance that is miscible with the solid wax, the organic substance having a solubility parameter greater than that of the solid wax;
   a polymer material that is miscible with at least one of the solid wax and the organic substance, the polymer material having a weight average molecular weight of 500 or more; and
   a coloring material.

2. The hot melt ink as claimed in claim 1, wherein the solubility parameter of the solid wax is equal to or less than 9.00.

3. The hot melt ink as claimed in claim 2, wherein the standard deviation of the solid wax's molecular weight distribution in the number of carbon atoms is 3.3 or less.

4. The hot melt ink as claimed in claim 1, wherein the solid wax has a melting point not lower than 60° C.

5. The hot melt ink as claimed in claim 1, wherein the solid wax comprises at least one wax selected from the group consisting of petroleum waxes, mineral waxes, synthetic hydrocarbons, ketones, and esters.

6. The hot melt ink as claimed in claim 1, wherein the organic substance has a solubility parameter not less than 9.01.

7. The hot melt ink as claimed in claim 1, wherein the organic substance comprises at least one substance selected from the group consisting of petroleum waxes, plant waxes, animal waxes, mineral waxes, hydrogenated waxes, modified waxes, higher fatty acids, higher alcohols, hydroxystearic acids, fatty acid amides, amines, esters, and polymerized waxes.

8. The hot melt ink as claimed in claim 1, wherein the organic substance is present in an amount of from 0.1 to 48 weight percent.

9. The hot melt ink as claimed in claim 1, wherein the polymer material has a weight average molecular weight of from 500 to 500,000.

10. The hot melt ink as claimed in claim 1, wherein the polymer material is present in an amount of from 0.1 to 48 weight percent.

11. The hot melt ink as claimed in claim 1, wherein the polymer material comprises at least one oil-soluble resin selected from the group consisting of olefin resins, vinyl resins, acrylic resins, phenolic resins, polyurethane resins, polyamide resins, polyester resins, ketone resins, alkyd resins, rosin-based resins, hydrogenated rosin resins, petroleum resins, hydrogenated petroleum resins, maleic acid resins, butyral resins, terpene resins, hydrogenated terpene resins, and cumarone-indene resins.

12. The hot melt ink as claimed in claim 1, wherein the coloring material comprises at least one organic pigment selected from the group consisting of quinacridone organic pigments, azo lake organic pigments, isoindolinone organic pigments, disazo organic pigments, and phthalocyanine pigments.

13. The hot melt ink as claimed in claim 1, wherein the coloring material comprises an inorganic pigment.

14. The hot melt ink as claimed in claim 1, wherein the coloring material comprises at least one dye selected from the group consisting of azo dyes, metal complex dyes, naphthol dyes, anthaquinone dyes, indigo dyes, carbonium dyes, quinoneimine dyes, cyanine dyes, quinoline dyes, nitro dyes, nitroso dyes, benzoquinone dyes, napthoquinone dyes, naphthalimide dyes, perionone dyes, and phthalocyanine dyes.

15. The hot melt ink as claimed in claim 1, wherein the coloring material is present in an amount of from 0.1 to 20 weight percent.

16. A hot melt ink for an ink jet printer, comprising:
   a solid wax that is solid at normal temperatures, the solid wax having a solubility parameter equal to or less than 9.50, the solid wax being present in an amount of 50% by weight or more, wherein the standard deviation of the solid wax's molecular weight distribution in the number of carbon atoms is 3.3 or less;
   an organic substance that is miscible with the solid wax, the organic substance having a solubility parameter greater than that of the solid wax;
   a polymer material that is miscible with at least one of the solid wax and the organic substance, the polymer material having a weight average molecular weight of 500 or more; and
   a coloring material.

17. The hot melt ink as claimed in claim 16, wherein the solid wax comprises at least one wax selected from the group consisting of petroleum waxes, mineral waxes, synthetic hydrocarbons, ketones, and esters.

18. The hot melt ink as claimed in claim 16, wherein the organic substance has a solubility parameter not less than 9.01.

19. The hot melt ink as claimed in claim 16, wherein the organic substance comprises at least one substance selected from the group consisting of petroleum waxes, plant waxes, animal waxes, mineral waxes, hydrogenated waxes, modified waxes, higher fatty acids, higher alcohols, hydroxystearic acids, fatty acid amides, amines, esters, and polymerized waxes.

20. The hot melt ink as claimed in claim 16, wherein the polymer material comprises at least one oil-soluble resin selected from the group consisting of olefin resins, vinyl resins, acrylic resins, phenolic resins, polyurethane resins, polyamide resins, polyester resins, ketone resins, alkyd resins, rosin-based resins, hydrogenated rosin resins, petroleum resins, hydrogenated petroleum resins, maleic acid resins, butyral resins, terpene resins, hydrogenated terpene resins, and cumarone-indene resins.

21. The hot melt ink as claimed in claim 16, wherein the coloring material is one of a pigment and a dye.

* * * * *